Feb. 7, 1933.    D. E. JONES    1,896,708
TIRE VALVE
Filed March 31, 1930
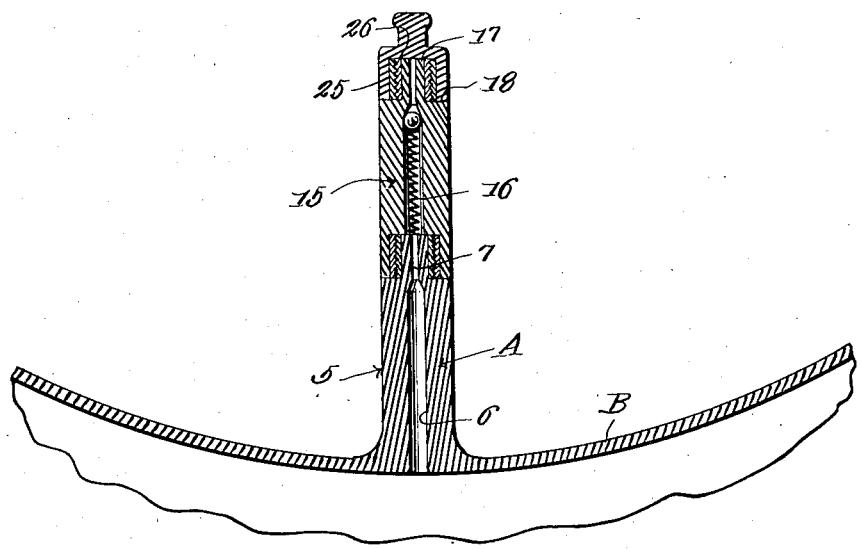
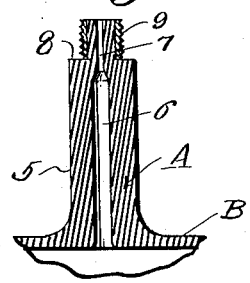 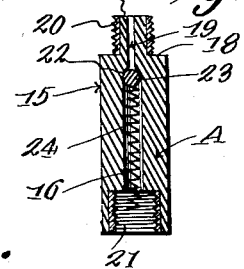
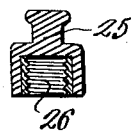
Inventor
DOLPHUS E. JONES
By Irving S. McCathran
Attorney Patented Feb. 7, 1933

1,896,708

UNITED STATES PATENT OFFICE

DOLPHUS E. JONES, OF SEMINOLE, OKLAHOMA, ASSIGNOR OF ONE-HALF TO HERSCHEL A. GASSAWAY, OF SEMINOLE, OKLAHOMA

TIRE VALVE

Application filed March 31, 1930. Serial No. 440,401.

This invention appertains to pneumatic tires of the type generally employed on automotive vehicles and more particularly to the inflatable inner tube thereof.

One of the primary objects of my invention is to provide a filling valve stem or casing integral with the body of the tire and formed from the same material, so as to provide a flexible stem or casing and thereby prevent the pulling of the stem or casing from the tire to prevent injury to the tire tube when the same becomes deflated from any cause.

Another important object of my invention is the provision of a tire tube having its stem or valve casing made of rubber and integrally connected with the inner tube, the said stem or valve casing being reinforced in any preferred way capable of being flexed, so as to permit the same to be pulled through the stem opening in the rim and felly of a wheel should the inner tube become deflated from any cause, the stem or valve casing being constructed in a novel way for receiving a check valve of the ball type, whereby flow of air through the stem or valve casing in one direction will be prevented.

Another important object of my invention is the provision of a flexible stem or valve casing for inner tubes embodying inner and outer sections, which are detachably connected together through the medium of reinforced threaded joints, the detachability of the sections permitting the convenient placing of the ball check valve into and out of operative position.

A still further object of my invention is to provide a flexible air filling stem or valve casing of the above character, which will be durable and efficient in use, one that will be simple and easy to manufacture, and one which can be placed upon the market and incorporated with a conventional inner tube at a small cost.

With these and other objects in view, the invention consists in the novel construction, arrangement and formation of parts, as will be hereinafter more specifically described, claimed, and illustrated in the accompanying drawing, in which drawing:—

Figure 1 is a fragmental circumferential section through an inner tube showing my improved air filling stem or valve casing in longitudinal section.

Figure 2 is a similar view in the outer section of the air filling stem or valve casing removed.

Figure 3 is a longitudinal section through the outer sections of the air filling stem or valve casing.

Figure 4 is a detail section through the closing cap for the air filling stem or valve casing.

Referring to the drawing in detail, wherein similar reference characters designate corresponding parts throughout the several views, the letter A generally indicates my improved air filling valve stem for a pneumatic tire inner tube B.

My improved filling valve stem or casing A is made of rubber and is of a flexible nature and is integrally connected with the wall of the inner tube B in any desired way. If preferred the air filling stem A can be reinforced by fabric or cord, but this is not essential to the invention.

As clearly shown the air filling stem or casing A comprises the inner section 5 and the outer section 15, each of which may be of substantially the same length, the inner section 5 being connected permanently and integrally with the inner tube B. The section 5 is provided with a longitudinally extending way or bore 6 which communicates with the interior of the inner tube B and this bore is preferably reduced in diameter as at 7 toward the outer end thereof. Likewise the outer portion of the section 5 at its outer end is reduced in diameter to provide a stop shoulder 8 and a threaded metallic sleeve 9 is fitted on the reduced outer portion of the section 5 and abuts against the stop shoulder 8. This threaded sleeve may be anchored to the reduced portion of the section 5 in any desired way.

The outer section 15 of the stem A is likewise provided with a longitudinally extending bore 16 and the outer end of the stem is provided with a reduced extension 17 defining an annular stop shoulder 18. The bore 16 is reduced in diameter as at 19 in said reduced extension 17 and this extension has fitted around the same and suitably anchored thereto a metallic threaded sleeve 20.

The inner end of the bore or the section 15 is enlarged in diameter and has fitted into the same and anchored thereto in any preferred way the internally threaded metallic sleeve 21, which sleeve 21 is adapted to be threaded on the metallic sleeve 9 of the section 5 for connecting the inner and outer sections 5 and 15 detachably together. It is to be further noted that the reduced portion 19 of the bore 16 defines a valve seat 22 on which is adapted to normally fit a ball valve 23. A light expansion coil spring 24 is employed for holding the valve 23 on its seat and when the section 15 is fitted on the section 5 the inner end of the same bears against the outer end of the section 5 and the outer end of the spring bears against the ball check valve. The provision of the threaded sleeves 9 and 21 insures the proper connection of the sections 5 and 16 together so that a tight fit will be had and to prevent the pulling, accidentally, of one section from the other.

The ball valve 23 fitting on its seat 22 prevents the normal escape of air to the bore in view of the fact that the section 15 is elastic, being made of rubber, the ball 23 fitting on the elastic seat will effectively seal the bore.

I can likewise provide a suitable closure or dust cap 25 for the reduced outer end 17 of the section 15 and this cap likewise can be made of rubber and can have fitted therein an externally threaded sleeve 26 for engaging the externally threaded sleeve 20 on the extension.

It is obvious from the foregoing that I have provided an improved tire air filling stem which is of a flexible nature and which will flex under stress and thereby permit the pulling of said stem through the felly and rim opening when the inner tube becomes deflated for any reason.

Changes in details may be made without departing from the spirit or the scope of this invention so long as these changes fall within the scope of the appended claim.

What I claim as new is:

A valve for a pneumatic tire comprising an integral rubber stem provided with a comparatively narrow longitudinally extending bore through the center thereof, contracted near the outer end, said stem also being provided with a reduced neck, a second section formed of rubber detachably secured to said reduced neck and provided with a longitudinal bore of greater diameter than the contracted end of said first mentioned bore, said bore of the second section being contracted at the outer end to form a valve seat, valve means in the larger portion of said longitudinally extending bore, a spring for holding said valve means on said seat, said spring resting at one end on the outer extremity of said stem around the contracted portion of the bore thereof, and closure means for the outer end of said second section.

In testimony whereof I affix my signature.

DOLPHUS E. JONES.